United States Patent
Oda et al.

(10) Patent No.: US 10,164,847 B2
(45) Date of Patent: Dec. 25, 2018

(54) DATA TRANSFER MONITOR SYSTEM, DATA TRANSFER MONITOR METHOD AND BASE SYSTEM

(71) Applicant: Hitachi, Ltd., Tokyo (JP)

(72) Inventors: Takuya Oda, Tokyo (JP); Hiroyasu Nishiyama, Tokyo (JP)

(73) Assignee: Hitachi, Ltd., Tokyo (JP)

(*) Notice: Subject to any disclaimer, the term of this patent is extended or adjusted under 35 U.S.C. 154(b) by 18 days.

(21) Appl. No.: 15/110,194

(22) PCT Filed: Mar. 18, 2014

(86) PCT No.: PCT/JP2014/057367
§ 371 (c)(1),
(2) Date: Jul. 7, 2016

(87) PCT Pub. No.: WO2015/140927
PCT Pub. Date: Sep. 24, 2015

(65) Prior Publication Data
US 2016/0330086 A1 Nov. 10, 2016

(51) Int. Cl.
*H04L 12/26* (2006.01)
*G06F 3/06* (2006.01)
(Continued)

(52) U.S. Cl.
CPC .............. *H04L 43/04* (2013.01); *G06F 3/067* (2013.01); *G06F 3/0608* (2013.01);
(Continued)

(58) Field of Classification Search
CPC .............. H04L 12/6418; H04L 41/069; H04L 41/0631; H04L 43/04; G06F 3/0608;
(Continued)

(56) References Cited

U.S. PATENT DOCUMENTS 8,438,275 B1 * 5/2013 Brooker .............. H04L 47/2408 709/224
9,088,540 B1 * 7/2015 Brooker .............. H04L 47/2408
(Continued)

FOREIGN PATENT DOCUMENTS

CN 102045542 A 5/2011

OTHER PUBLICATIONS

International Search Report of PCT/JP2014/057367 dated Jun. 24, 2016.
Chinese Office Action received in corresponding Chinese Application No. 201480073041.1 dated Aug. 31, 2018.

*Primary Examiner* — Kostas J Katsikis
(74) *Attorney, Agent, or Firm* — Mattingly & Malur, PC

(57) ABSTRACT

Transfer of desired monitoring data is enabled while restraining a data storage capacity and transfer capacity. A base system senses an alert and generates an index for specifying collection target data that is data present within a predetermined collection target time including an alert occurrence time point, records the collection target data in association with the index, into a time-series data table, and stores alert identification information in association with the index, into an index specifying table. A center system receives the alert identification information and transmits a data request for requesting the collection target data, to the base system. The base system, upon receipt of the data request, acquires the index associated with the designated alert identification information by searching the index specifying table, acquires the collection target data specified by the index from the time-series data table, and transmits the acquired data to the center system.

20 Claims, 13 Drawing Sheets

(51) Int. Cl.
*H04L 12/24* (2006.01)
*H04L 12/64* (2006.01)

(52) U.S. Cl.
CPC .......... *G06F 3/0643* (2013.01); *G06F 3/0647* (2013.01); *G06F 3/0653* (2013.01); *H04L 12/6418* (2013.01); *H04L 41/069* (2013.01); *H04L 41/0631* (2013.01)

(58) Field of Classification Search
CPC .... G06F 3/0643; G06F 3/0647; G06F 3/0653; G06F 3/067
See application file for complete search history.

(56) References Cited

U.S. PATENT DOCUMENTS

| | | | |
|---|---|---|---|
| 2007/0080816 A1* | 4/2007 | Haque | B60K 28/066 340/576 |
| 2009/0006421 A1 | 1/2009 | Pantos | |
| 2010/0174945 A1* | 7/2010 | Watanabe | G06F 11/0709 714/26 |
| 2011/0119100 A1* | 5/2011 | Ruhl | G06F 17/3089 705/7.11 |
| 2015/0178984 A1* | 6/2015 | Tateishi | H04L 41/22 345/419 |
| 2015/0256435 A1* | 9/2015 | Sum | G01R 25/00 702/62 |
| 2016/0132538 A1* | 5/2016 | Bliss | G05B 19/41855 707/741 |

\* cited by examiner

Fig. 3    Time-series data table 300

| Time point | Sequence ID | Transfer-source identification information | Transfer-destination identification information | Next Sequence ID | Index |
|---|---|---|---|---|---|
| 14/01/31-00:01:02:899456 | 1 | 10.11.0.12 | 28.21.23.25 | 2 | 0001 |
| 14/01/31-00:01:02:899609 | 101 | 63.74.33.45 | 10.11.0.12 | 102 | 0002-0006 |
| 14/01/31-00:01:02:899957 | 3 | 10.11.0.12 | 13.15.28.25 | 4 | 0007 |
| 14/01/31-00:01:02:900002 | 102 | 10.11.0.12 | 63.74.33.45 | 103 | 0008 |
| 14/01/31-00:01:02:900192 | 2 | 28.21.23.25 | 10.11.0.12 | 5 | 0009-0010 |
| 14/01/31-00:01:02:901394 | 4 | 13.15.28.25 | 10.11.0.12 | 6 | 0011-0016 |
| 14/01/31-00:01:02:902392 | 5 | 28.21.23.25 | 10.11.0.12 | 7 | 0017-0018 |

Fig. 4

Metric data table 400

| Access-source identification information | Access-destination identification information | Metric data (response time) (msec) |
|---|---|---|
| 10.11.0.12 | 63.74.33.45 | 8.87342 |
| 10.11.0.12 | 28.21.23.25 | 5.46163 |
| 10.11.0.12 | 13.15.28.25 | 14.37508 |
| 10.1.0.10 | 63.74.233.45 | 34.592 |

Fig. 5

Alert table 500

| Alert ID | Occurrence date and time point | Access source identification information | Access destination identification information | Alert content |
|---|---|---|---|---|
| 0000 | 14/01/31-00:01:03.001 | 10.11.0.12 | 28.21.23.25 | Attention (delayed response) |
| 0001 | 14/01/31-00:03:04.234 | 10.11.0.12 | 63.74.33.45 | Warning (delayed response) |
| 0002 | 14/01/31-01:15:03.459 | 10.1.0.10 | 63.74.233.45 | Warning (delayed response) |

Fig. 6

Index specifying table 600

| Alert ID | Search ID | Index list |
|---|---|---|
| 0001 | -34 | 0001 |
| 0001 | -33 | 0002, 0003 |
| ... | | |
| 0001 | -1 | 0120, 0121 |
| 0001 | 0 | 0122 - 0225 |
| 0001 | 1 | 0226, 0227 |
| ... | | |
| 0001 | 32 | 0439, 0440 |
| 0001 | 33 | 0441, 0442 |
| 0002 | -28 | 1143, 1144, 1145 |
| 0002 | -27 | 1146, 1147, 1148 |
| ... | | |

Fig. 7

Base-apparatus table 700

| Base identification information | Apparatus identification information |
|---|---|
| Base A | 10.8.1.2 |
| Base A | 10.1.0.10 |
| Base A | 10.2.100.101 |
| ... | |
| Base B | 133.128.10.2 |
| Base B | 133.124.34.25 |
| ... | |

DATA TRANSFER MONITOR SYSTEM, DATA TRANSFER MONITOR METHOD AND BASE SYSTEM

TECHNICAL FIELD

The present invention relates to a technology for monitoring a system that transfers data.

BACKGROUND ART

In order that a large volume of time-series data sequentially generated from a large number of sensors, network apparatuses, etc., are transferred over a network at high speed, there is known a technology for collecting a plurality of small chunks of data items and transferring these data items altogether at a time. For example, PTL 1 discloses a technology in which even when a data transfer request is received, the data is not promptly transferred and the transfer is put on hold for a constant period, and when another data transfer request is received within the same period, the data for these data transfer requests are collectively transmitted at a time.

CITATION LIST

Patent Literature

[PTL 1] US2009/0006421A1, "Methods and Systems for Rapid Data Acquisition over The Internet", Apple Inc. (2009)

SUMMARY OF INVENTION

Technical Problem

When a large volume of time-series data are transmitted over a network, it is desired to transmit efficiently and collectively, at a time, only the data desired by a user or an application. In order that the conventional art in PTL 1 is efficiently used for the time-series data, the time-series data may be divided and stored into small chunks where possible and the small chunks of data may be collectively transmitted at a time in response to a user's request. However, when the time-series data generated in a large volume are saved as a file, there may occur a case where it is not possible to properly save the data due to an upper limit on the number of files that can be stored in a file server.

Further, generally, when time-series data experiences an abnormality, the data stored within a particular time before and after the abnormality occurs is highly related with the abnormality, and thus, it is desired to transfer the data at a time. However, the farther a time, the lower the association. Moreover, in an environment where a large number of sensors and apparatuses are installed, unnecessary data is hopefully not collected if possible. Thus, there is also a need to gradually collect the data stored before and after the occurrence of the abnormality.

An object of the present invention is to provide a technology for enabling transfer of desired data for monitoring while restraining a data storage capacity and transfer capacity.

Solution to Problem

A data transfer monitoring system according to an aspect of the present invention includes: a base system configured to record and exchange data; and a center system that is coupled, via a network, to the base system and is configured to monitor the base system, in which the base system is configured to: sense an alert with real-time analysis for data to be exchanged; generate an index for specifying collection target data that is data present within a predetermined collection target time including an alert occurrence time point; record the collection target data in association with the index, into a time-series data table; store alert identification information in association with the index, into an index specifying table; and transmit the alert identification information to the center system, the center system is configured to: upon receipt of the alert identification information, designate the alert identification information and transmit a data request for requesting the collection target data, to the base system, the base system is configured to: upon receipt of the data request, acquire the index associated with the designated alert identification information by searching the index specifying table; and acquire the collection target data specified by the index from the time-series data table, and transmits the acquired data to the center system, and the center system is configured to record the collection target data upon receipt of the collection target data.

Advantageous Effects of Invention

According to the present invention, in a system configured to monitor a data transfer, it is possible to transfer desired data for monitoring while restraining a data storage capacity and transfer capacity.

BRIEF DESCRIPTION OF DRAWINGS

FIG. 3 is a diagram showing one example of a table of time-series data accumulated at a base FIG. 4 is a diagram showing one example of a table of metric data measured at a base FIG. 5 is a diagram showing one example of an alert table generated at a base FIG. 6 is a diagram showing one example of an index specifying table generated at a base FIG. 7 is a diagram showing one example of a base-apparatus table held in a network monitoring center

DESCRIPTION OF EMBODIMENTS

Figure 1:
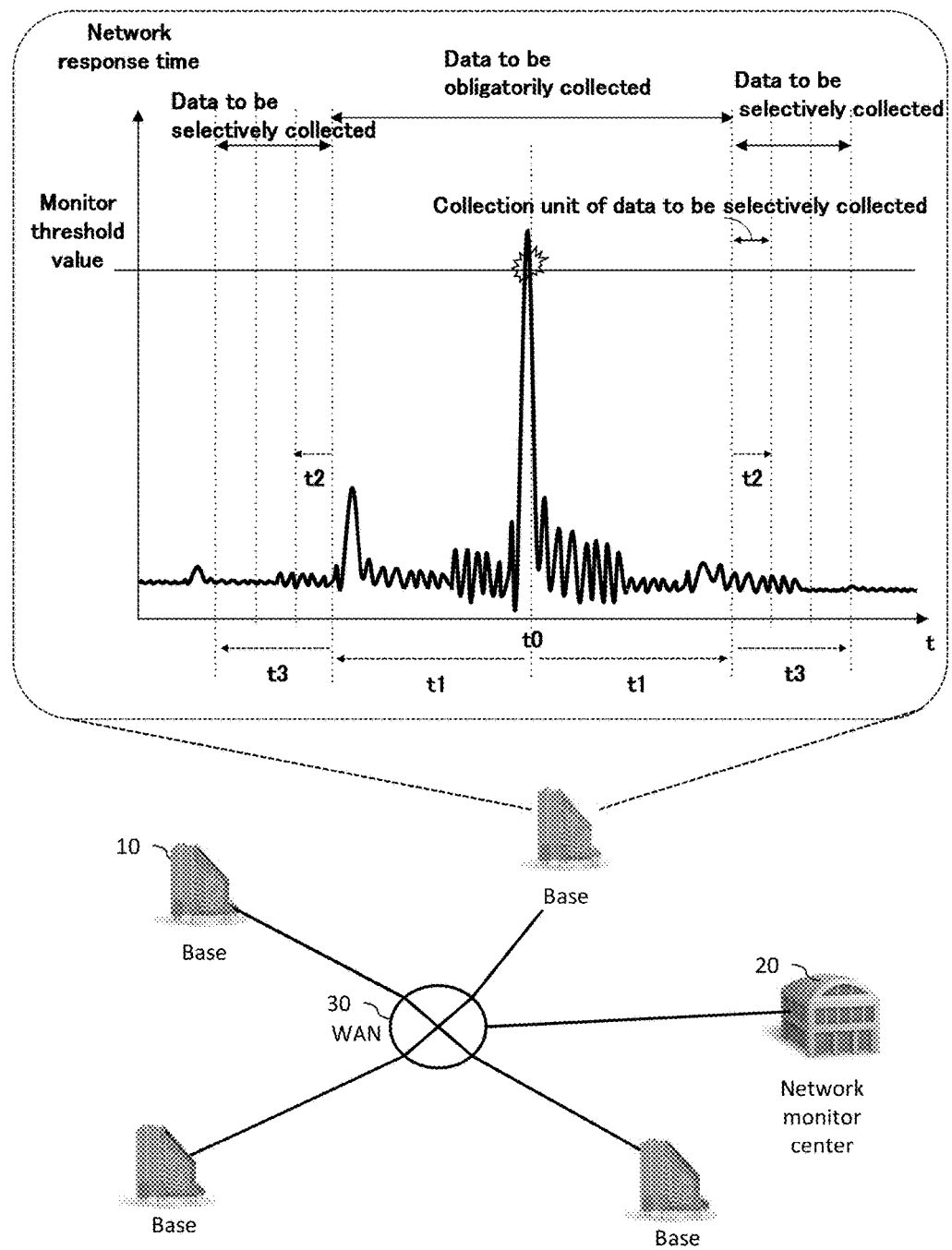
FIG. 1 is a schematic block diagram of a data transfer system

With reference to the drawings, an embodiment of the present invention will be described, below.

It should be noted that in the description that follows, information may be described by using expressions such as "aaa table"; however, the information may not necessarily be a data structure such as a table, and may be expressed in other formats. In order to indicate that such information is not dependent on a data structure, "aaa table", etc., may be referred to as "aaa information". Furthermore, when a content of each item of information is described, identification information expressed as "number" and "name" is used; however, this is just one example and identification information on another type may be used.

Further, in the description that follows, description may proceed where a "bb part" is used as a subject. However, such a function part is realized when a processor executes a process by using a memory and a communication port (network interface), and thus, the description may proceed where the same holds true by using a processor as a subject. Moreover, a process described where such a function part is used as a subject may be interpreted as a process executed by a computer such as a monitoring system.

Furthermore, a part or all of such a function part may be realized by dedicated hardware. Various types of function parts may be realized by a software program installed in each computer by a storage medium that is readable by a program distribution server or a computer. In such a case, various types of function parts and the server may be installed in the same one computer and executed, and these may be respectively installed in a plurality of computers and executed.

Further, in the description that follows, reference numerals of a plurality of elements of the same type are indicated by a combination of child numerals different from the same parent number. When description proceeds where the elements of the same type are not distinguished, description proceeds by using a parent number only out of reference numerals, and when description proceeds where the elements of the same type are distinguished, description may proceed by using a reference numeral.

It is noted that in all embodiments and examples that follow, network packet data is adopted as time-series data and description proceeds along a use case where the network packet is monitored. However, the embodiments or the examples are illustrative for the description of the present invention, and it is not intended to limit the scope of the present invention to the embodiments or the examples thereof only. A person skilled in the art is capable of implementing the present invention in various other modes without departing from the gist of the present invention.

Firstly, an overview of an embodiment of the present invention will be described.

FIG. 1 is a schematic block diagram of a data transfer system.

Figure 2:
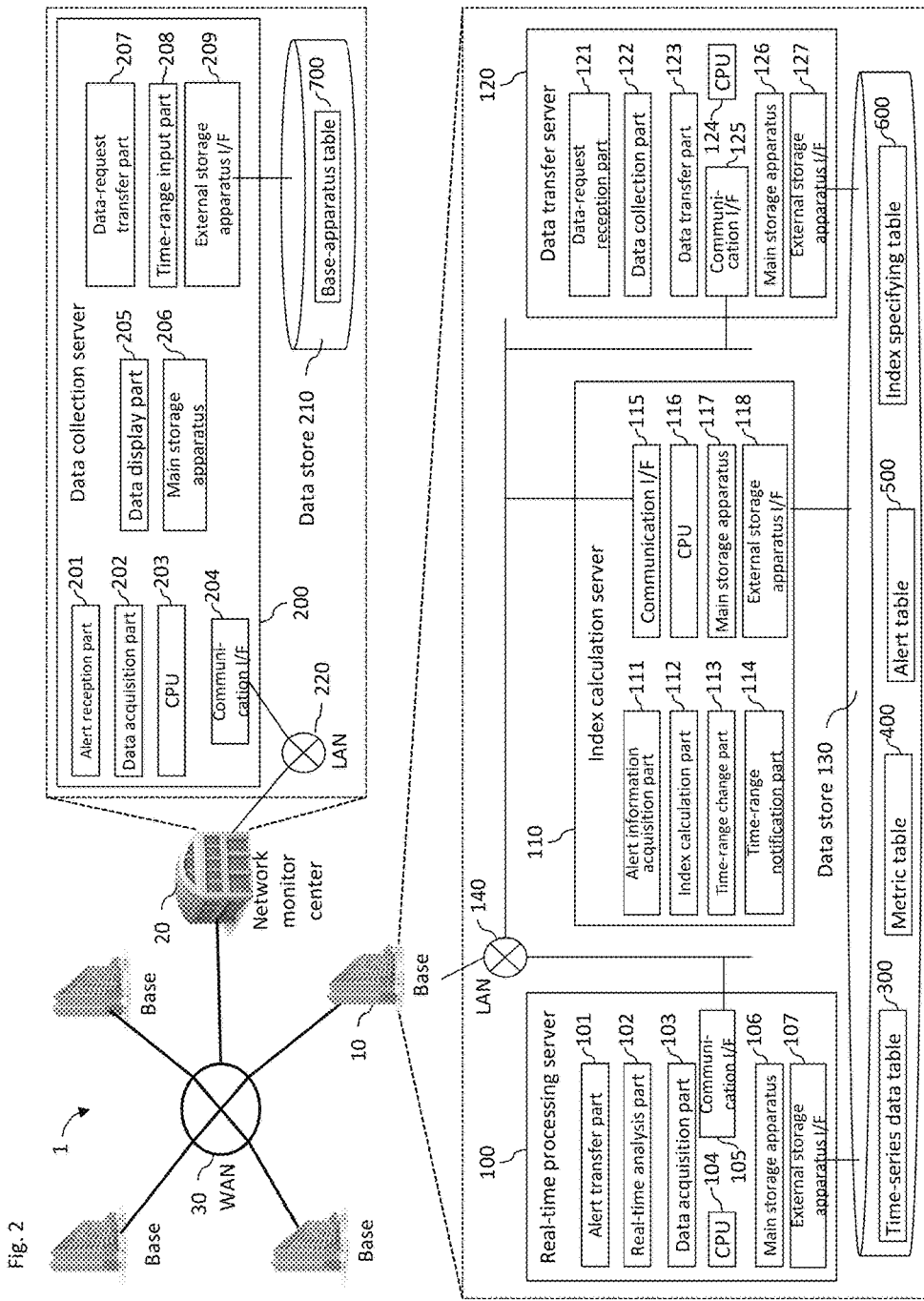
FIG. 2 is a block showing an internal configuration of a base and a network monitoring center

FIG. 2 is a block showing an internal configuration of a base and a network monitoring center.

With reference to FIG. 1, a network monitoring center 20 is coupled to a plurality of bases 10 by a WAN (Wide Area Network) 30. The WAN 30 is an Internet network, a dedicated line, or a combination thereof, for example. In such an environment, the network monitoring center 20 monitors the plurality of bases 10. Further, in FIG. 1, a situation is shown where at a certain base 10, a network response time exceeds a threshold value and an alert occurs.

With reference to FIG. 2, at the bases 10, a time-series data table 300 that accumulates time-series data to which an index is attached, a metric table 400 that accumulates various types of metrics, an alert table 500 that accumulates an alert ID of a sensed alert, and an index specifying table 600 for specifying the index from the alert ID are arranged.

A large volume of packet data are sequentially transmitted from each base 10 toward another base 10. At each base 10, a history of packet data exchange is accumulated in the time-series data table 300 in a time series manner.

Further, at each base 10, when the packet data is exchanged, a value of various types of metrics such as a response time, an error rate, and throughput is calculated, and recorded into the metric table 400.

As shown in FIG. 1, at each base 10, the value of the metric data is compared with a threshold value. When the value of the metric exceeds the threshold value, the base 10 generates an alert, records the alert in the alert table 500, and notifies the network monitoring center 20 thereof.

The network monitoring center 20 monitors the soundness of the WAN 30, and upon receipt of the alert from the base 10, the network monitoring center 20 analyzes the cause of the occurrence of the alert. During that time, to analyze the cause of the alert, it is necessary to collect the packet data exchanged by each base 10. At this time, it is preferable to collect all necessary packet data in as short a time as possible.

In the present embodiment, the data of the network packet before and after the alert occurs are classified in accordance with a time from an alert occurrence date and time point.

It is highly possible that the data within a predetermined time immediately before and immediately after the alert occurrence time point strongly involves the alert, and thus, such data must be collected. In FIG. 1, data within times t1 before and after an alert occurrence time point t0 is data to be obligatorily collected that should always be collected. The data to be obligatorily collected is to be collected altogether at a time.

Data that is farther from the alert occurrence time point t0 as compared to the data to be obligatorily collected but remains within times t3 before and after the alert occurrence time point t0 is thought to be selectively collected where necessary. In FIG. 1, the data within the time t3 is the data to be selectively collected. The data to be selectively collected is weaker in relationship with the alert than the data to be obligatorily collected, and thus, in order to avoid waste, the data to be selectively collected is collected in a unit of time t2 where necessary.

Data at a time point farther from the alert occurrence time point t0 than the data to be selectively collected, that is, data at a time point farther by a time (t1+t3) than the alert occurrence time point t0, extremely weekly involves the alert, and thus, such data needs not be collected for analysis of the cause of the alert.

It is noted that times t1, t2, and t3 may be input by a user from a time-range input screen, which is one of the screens displayed in a data collection server 200, or may be input from an external application.

A physical configuration of a group of apparatuses installed respectively at the bases 10 or the network monitoring center 20 is not particularly limiting. Any apparatus and any other apparatus may be physically configured integrally. In this case, a plurality of apparatuses arranged at the base 10 are also collectively called a base system 10, and a plurality of apparatuses arranged at the network monitoring center 20 are also collectively called a center system 20.

The base system 10 senses the alert with the real-time analysis for the data to be exchanged, and generates an index for specifying the collection target data which is data present within a predetermined collection target time including the alert occurrence time point. The format of the index is not particularly limited; however, it may be possible to impart a value equivalent to an address within a storage. This facilitates finding of data from within the storage by using the index as an address.

Further, the base system 10 registers the collection target data in association with the index into the time-series data table 300, stores the alert identification information in association with the index into the index specifying table 600, and transmits the alert identification information to the center system 20.

Upon receipt of the alert identification information, the center system 20 designates the alert identification information and transmits, to the base system 10, the data request for requesting the collection target data.

Upon receipt of the data request, the base system 10 acquires the index associated with the designated alert identification information by searching the index specifying table 600, acquires the collection target data specified by the index from the time-series data table 300 and transmits the acquired data to the center system 20.

Upon receipt of the collection target data, the center system 20 records the collection target data.

According to the present embodiment, in the base system 10, when the alert is detected, the data within the collection target time including the alert occurrence time point is recorded together with the index, and in response to the request from the center system 20, the data is extracted by the index and transmitted to the center system 20. As a result, it is possible to efficiently record and collect only the data to be collected.

Further, in the present embodiment, the base system 10 classifies the collection target data into: the data to be obligatorily collected that is data present within the obligatory-collection target time (in FIG. 1, a time over the time point t0+/−the time t1) including the alert occurrence time point; and the data to be selectively collected that is data present within the selection target time (in FIG. 1, a time between (the time point t0−the time t1−the time t3) and (the time point t0−the time t1)), and a time between (the time point t0+the time t1) and (the time point t0+the time t1+the time t3)) before and/or after the obligatory-collection target time, and generates the index for each of the data. Further, upon receipt of the data request from the center system 20, the base system 10 transmits the data to be obligatorily collected to the center system 20, and upon further receipt of the data request for requesting the data to be selectively collected from the center system 20, the base system 10 transmits the data to be selectively collected to the center system 20.

As a result, the data to be obligatorily collected which is important for the alert analysis is first collected and when the request is subsequently made where necessary, the data to be selectively collected present before and after the data to be obligatorily collected is collected, and it is thereby possible to efficiently collect the necessary data only.

Further, in the present embodiment, the base system 10 divides the selective-collection target time into a plurality of collection unit times (time t2) and generates the index for each of the unit data to be selectively collected which is data in each of the collection unit times. When acquiring the selective-collection target data, the center system 20 transmits the data request in which the unit data to be selectively collected is designated. Upon receipt of the data request, the base system 10 transmits the unit data to be selectively collected designated in the data request, to the center system 20.

According thereto, it is possible to designate and collect only necessary data to be selectively collected, and thus, it is possible to efficiently collect the necessary data.

In the data transfer system of this type, a method of accessing data includes a block access and a file access.

In the present embodiment, in a case of the block access, when the uncollection target data is included in a file including the collection target data, in the data to be exchanged, the base system 10 deletes the uncollection target data from the file and generates the index for the resultant file. It is probable that the collection target data and the collected-target data are included in the file; however, as described above, when the uncollection target data is deleted, it is possible to efficiently collect the collection target data only.

Further, in the present embodiment, in a case of the file access, when, in the data to be exchanged, the collection target data that should be transmitted at a time are divided into a plurality of files, the base system 10 combines the plurality of files and generates the index for the resultant one file. It is probable that the collection target data extends over a plurality of files; however, as described above, when the plurality of files are combined, it is possible to collect the combined file as one file.

Further, in this type of system, a plurality of alerts may occur in a short time due to a common cause. The present embodiment is well prepared for such a case to happen, and when another alert is sensed within the collection target time of the alert occurrence time point of the sensed alert, the base system 10 expands the collection target time on the basis of the alert occurrence time point of another alert. As a result, when the plurality of alerts occur in a near time, it is possible to efficiently acquire the collection target data as one set thereof, in association with one another, and in addition, it is possible to appropriately perform alert analysis.

Further, in this type of system, as the cause of the alert, a plurality of base systems 10 may be involved. The present embodiment is well prepared for such a case to happen, and when an alert is sensed, a certain base system (in this case, referred to as "first base system") 10 transmits the alert identification information and the collection target time to another base system (in this case, referred to as "second base system") 10. Then, the second base system 10 applies the received alert identification information and collection target time to the second base system 10 itself, and updates the time-series data table 300 and the index specifying table 600. As a result, it is possible to collect data on an alert from a plurality of involving bases 10 and it is possible to appropriately analyze an alert in which a plurality of bases 10 are possibly involved.

Further, in this type of system, an alert may occur in a plurality of base systems 10 in a short time due to a common cause, for example. The present embodiment is well prepared for such a case to happen, and when an alert is sensed, a first base system 10 transmits the alert identification information, the alert occurrence time point, and the collection target time, to the second base system 10. When the alert occurrence time point of the alert sensed by the first base system 10 is present within the collection target time for the alert sensed by the second base system 10, the second base system 10 expands the collection target time of the second base system 10 on the basis of the alert occurrence time point of the first base system 10 and transmits the expanded collection target time to the first base system 10. The first base system 10 specifies a maximum collection target time of the expanded collection target time received from the second base system 10 and the collection target time of the first base system 10, applies the maximum collection target time to the first base system 10, and requests the second base system 10 to apply the maximum collection target time. According thereto, it is possible to collect, from a plurality of base systems 10, data of the maximum collection target time that may allow for collective alarm analysis on the alerts which occur in a plurality of base systems 10, and it is possible to appropriately analyze an alert in which a plurality of base systems 10 are possibly involved.

A more specific example will be described below.

Example

As shown in FIG. 2, at each base 10, a real-time processing server 100, an index calculation server 110, a data transfer server 120, and a data store 130 are arranged. The real-time processing server 100, the index calculation server 110, and the data transfer server 120 are coupled to an LAN 140. The data store 130 can be accessed from the real-time processing server 100, the index calculation server 110, and the data transfer server 120.

In the network monitoring center 20, the data collection server 200 and a data store 210 are arranged. The data collection server 200 is coupled to an LAN 220, and the data store 210 can be accessed from the data collection server 200.

The real-time processing server 100 has an alert transfer part 101, a real-time analysis part 102, a data acquisition part 103, a CPU 104, a communication I/F (interface) 105, a main storage apparatus 106, and an external storage apparatus I/F 107.

The alert transfer part 101 determines whether or not a value of a metric such as a response time and an error rate calculated by the real-time analysis part 102 exceeds a preset threshold value. When the value of a metric exceeds the threshold value, the alert transfer part 101 senses an alert, and transmits the alert information to the index calculation server 110 and the network monitoring center 20 and stores the alert information in the alert table 500.

The real-time analysis part 102 calculates a value of metric data 403 (in this example, a network response time) on the basis of the packet data acquired by the data acquisition part 103 and described in the time-series data table 300, and describes the value in the metric table 400.

A specific method for calculating the network response time is to refer to a sequence ID 302, transfer-source identification information 303, transfer-destination identification information 304, and a next sequence ID 305 in the time-series data table 300 as shown in FIG. 3 so as to search for a combination of packet data A and B where the transfer-source identification information 303 of the packet data A and the transfer-destination identification information 304 of the packet data B are identical, the transfer-destination identification information 304 of the packet data A and the transfer-source identification information 303 of the packet data B are identical, and the next sequence ID 305 of the packet data A and the sequence ID 302 of the packet data B are identical.

When a combination of the packet data A and B is discovered, a time obtained by subtracting a time point 301 of a packet A from a time point 301 of the packet data B is calculated as a response time. Then, the metric table 400 is to store the transfer-source identification information 303 of the packet data A as access-source identification information 401, the transfer-destination identification information 304 as access-destination identification information 402, and the calculated response time as metric data 403. When there are a plurality of combinations of the packet data A and B, an average value of a plurality of calculated response times is calculated and the average value is stored as the response time 403.

The data acquisition part 103 acquires the packet data exchanged by the communication I/F 105, stores the packet data in the time-series data table 300 via the external storage I/F 107, and notifies the real-time analysis part 102 of the storage.

The CPU 104 executes a computer program (hereinafter, referred to as "program"). When the CPU 104 executes the program, various functions provided in the real-time processing server 100 are realized.

The communication I/F 105 is an interface for coupling the real-time processing server 100 to the LAN 140 and the WAN 30.

The main storage apparatus 106 is a storage apparatus that stores a program and data, etc. The main storage apparatus 106 includes a DRAM (Dynamic Access Memory), for example. The program and the data stored in the main storage apparatus 106 can be accessed from the CPU 104, the communication I/F 105, and the external storage apparatus I/F 107.

The external storage apparatus I/F 107 is an interface for coupling the real-time processing server 100 and the data store 130.

The index calculation server 110 has an alert information acquisition part 111, an index calculation part 112, a time-range change part 113, a time-range notification part 114, a communication I/F 115, a CPU 116, a main storage apparatus 117, and an external storage apparatus I/F 118.

The alert information acquisition part 111 receives the alert information transmitted from the alert transfer part 101 of the real-time processing server 100, and notifies the index calculation part 112 of the received alert information.

Figure 9:
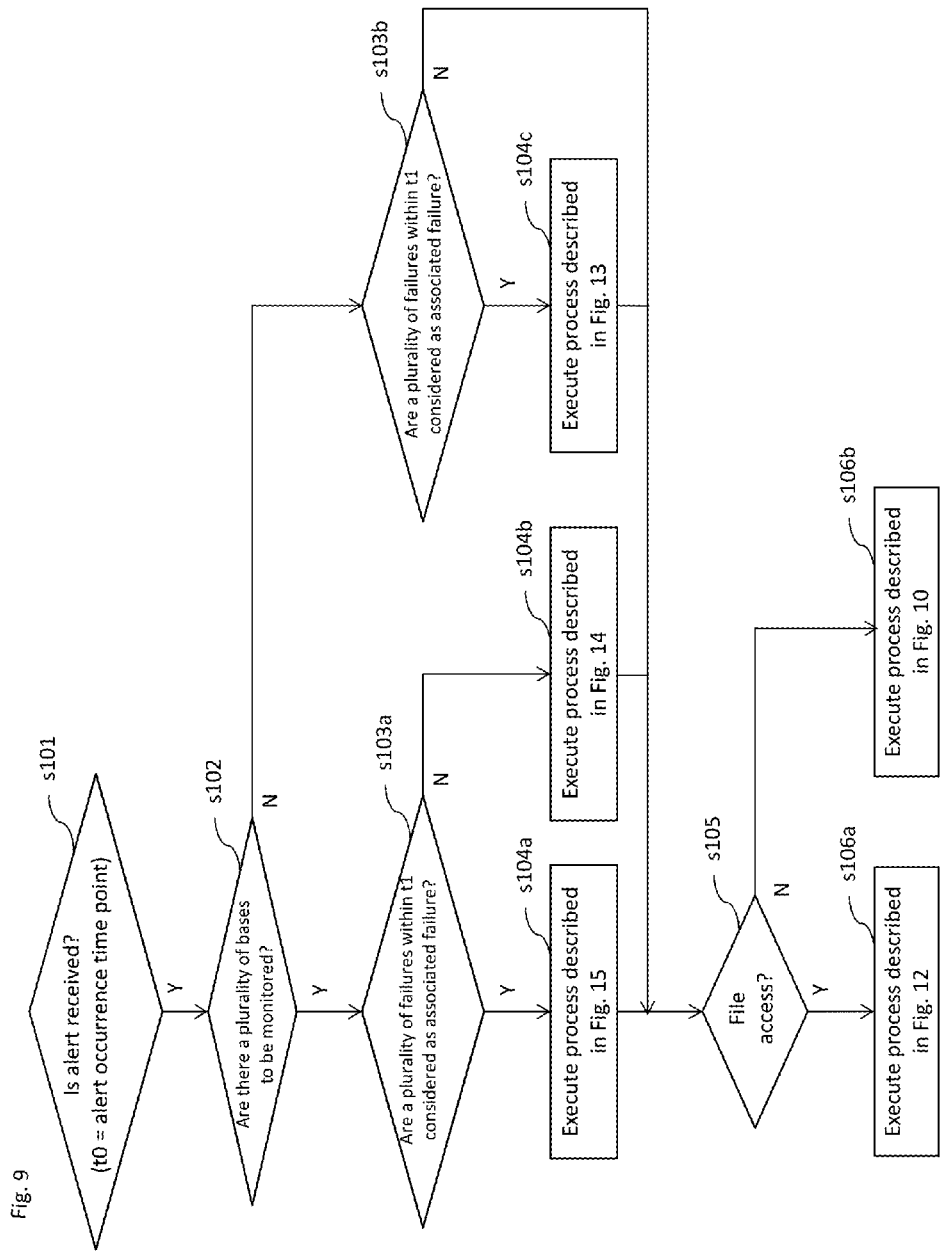
FIG. 9 is a flowchart showing one example of an index calculation process

Upon receipt of the alert information from the alert information acquisition part 111, the index calculation part 112 executes an index calculation process shown in FIG. 9 and stores a list of calculated indexes, together with the alert ID and the search ID, into the index specifying table 600.

In a process relating to a time range over which data on a network packet is acquired, the time-range change part 113 sets or changes, where necessary, times t1 to t3 input by an external application or a user via a time-range input screen of the data collection server 200. Further, the time-range change part 113 instructs the index calculation part 112 to calculate an index after changing the times t1 to t3.

The time-range notification part 114 notifies another base 10 or the network monitoring center 20 of a set value of the present times t0 to t3.

The communication I/F 115, the CPU 116, the main storage apparatus 117, and the external storage apparatus I/F 118 are the same in function and configuration as the above-described communication I/F 105, CPU 104, main storage apparatus 106, and external storage apparatus I/F 107, and thus, the description thereof will be omitted.

The data transfer server 120 has a data-request reception part 121, a data collection part 122, a data transfer part 123, a CPU 124, a communication I/F 125, a main storage apparatus 126, and an external storage apparatus I/F 127.

The data-request reception part 121 receives a data collection request from the network monitoring center 20, and transmits a request content in the data collection request to the data collection part 122.

The data collection part 122 acquires, from the data store 130, packet data that should be transmitted to the network monitoring center 20 (collection target data) on the basis of the request content of the data collection request received from the data-request reception part 121, and transmits the packet data to the data transfer part 123.

The data transfer part 123 transmits the packet data collected by the data collection part 122 to the network monitoring center 20.

The CPU 124, the communication I/F 125, the main storage apparatus 126, and the external storage apparatus I/F 127 are the same in function and configuration as the above-described CPU 104, communication I/F 105, main storage apparatus 106, and external storage apparatus I/F 107, and thus, the description thereof will be omitted.

The network monitoring center 20 has the data collection server 200 and the data store 210, and the data collection server 200 is coupled to the LAN 220.

The data collection server 200 has an alert reception part 201, a data acquisition part 202, a CPU 203, a communication I/F 204, a data display part 205, a main storage apparatus 206, a data-request transfer part 207, a time-range input part 208, and an external storage apparatus I/F 209.

The alert reception part 201 receives an alert from the alert transfer part 101 of the real-time processing server 100 at each base 10.

The data acquisition part 202 acquires the packet data that should be collected and that is transmitted from the data transfer part 123 of the data transfer server 120 at each base 10, and transmits the packet data to the data display part 205.

The data display part 205 displays the packet data acquired by the data acquisition part 202, on a screen.

The data-request transfer part 207 uses the alert received by the alert reception part 201 as a key to request the packet data associated with the alert (collection target data) to the data-request reception part 121 of the data transfer server 120 at each base 10.

The time-range input part 208 provides an interface for inputting a time range of the times t1 to t3 and inputting data-collection-destination base information, to a user or an application so that a collection rage of the packet collection target data and the data collection destination can be defined or changed. Further, the time-range input part 208 transmits the input times t1 to t3 and data-collection-destination base information, to the time-range change part 113 of the index calculation server 110 at each base 10.

The CPU 203, the communication I/F 204, the main storage apparatus 206, and the external storage apparatus I/F 209 are the same in function and configuration as the above-described CPU 104, communication I/F 105, main storage apparatus 106, and external storage apparatus I/F 107, and thus, the description thereof will be omitted.

FIG. 3 is a diagram showing one example of a table of time-series data accumulated at the base In the time-series data table 300, a time point 301, the sequence ID 302, the transfer-source identification information 303, the transfer-destination identification information 304, the next sequence ID 305, and an index 306 are recorded with respect to the data exchanged at the base 10.

The time point 301 indicates a time point at which the packet data is transmitted or received.

The sequence ID 302 is a serial number for uniquely specifying the packet data exchanged between a transfer source uniquely specified by the transfer-source identification information 303 and a transfer destination uniquely specified by the transfer-destination identification information 304.

The transfer-source identification information 303 is identification information for uniquely specifying an apparatus from which the packet data is transmitted, and includes an IP address and a host name, for example. By the information in the transfer-source identification information 303, the packet data is associated with metric data specified by the access-source identification information 401 in the metric table 400 and the alert specified by access-source identification information 503 in the alert table 500. Further, by the information in the transfer-source identification information 303, the packet data is associated with a base specified by apparatus identification information 702 of a base-apparatus table 700.

The transfer-destination identification information 304 is identification information for uniquely specifying an apparatus to which the packet data is transmitted, and includes an IP address and a host name, for example. By the information in the transfer-destination identification information 304, the packet data is associated with metric data specified by the access-destination identification information 402 in the metric table 400 and the alert specified by access-destination identification information 504 in the alert table 500. Further, by the information in the transfer-destination identification information 304, the packet data is associated with a base specified by the apparatus identification information 702 of the base-apparatus table 700.

The next sequence ID 305 indicates a sequence ID 302 of packet-data transmitted, next to the current packet data, from the transfer source or the transfer destination. For example, if the next sequence ID 305 of packet data A is 2, then the sequence ID 302 of the packet data transmitted next from the transfer destination of the packet data A to the transfer source of the packet data A is always 2. That is, the packet data can be uniquely specified by the transfer-source identification information 303, the transfer-destination identification information 304, and the sequence ID 302, and when the information indicated by the next sequence ID 305 is added thereto, an association between the packet data and another packet data, an order in which data is exchanged, etc., can be uniquely specified. This specification is adopted in a general network protocol such as TCP/IP.

The index 306 is identification information for uniquely specifying a place where the packet data within the data store 130 is stored, and includes a block ID within a storage, a full path of a file within a file storage, and a URI of a file within a cloud storage, for example. With the index 306, the packet data is associated with an alert ID 601 indicated by an index within an index list 603 of the index specifying table 600.

The packet data collected by the data acquisition part 103 of the real-time processing server 100 at each base 10 is stored in the time-series data table 300.

FIG. 4 is a diagram showing one example of a table of metric data measured at the base.

In the metric table 400, the access-source identification information 401, the access-destination identification information 402, and the metric data 403 are recorded with respect to each of metric items. In an example of FIG. 4, a response time of an access is recorded for a set of an access source and an access destination.

The access-source identification information 401 indicates identification information on a transfer source of packet data, and the same identification information as the transfer-source identification information 303 of the time-series data table 300 is stored.

The access-destination identification information 402 indicates identification information on a transfer destination of packet data, and the same identification information as the transfer-destination identification information 304 of the time-series data table 300 is stored.

With respect to the metric data 403, a predetermined performance value of the packet data exchanged between the access source indicated by the access-source identification information 401 and the access destination indicated by the access-destination identification information 402 is stored as a metric. A representative metric includes a response time, an error rate, and a throughput, and as described above, in the present example, the response time is recorded as the metric data. The response time is calculated by the real-time analysis part 102 of the real-time processing server 100, as described above. At each base 10, the metric data 403 is calculated by the real-time analysis part 102 of the real-time processing server 100, and stored in the metric table 400. It should be noted that in the present example, one type of metric data (response time) only is monitored; however, a plurality of types of metric data may be calculated as a target to be monitored.

FIG. 5 is a diagram showing one example of an alert table generated at the base.

In the alert table 500, an alert ID 501, an occurrence date and time point 502, the access-source identification information 503, the access-destination identification information 504, and an alert content 505 are recorded for each of the sensed alerts.

The alert ID 501 is identification information for uniquely specifying an alert at each base 10. With the alert ID 501, the alert is associated with the index list 603 indicated by the alert ID 601 of the index specifying table 600 within the same base 10 and the index within the index list 603.

In the occurrence date and time point 502, a time point at which the alert transfer part 101 of the real-time processing server 100 has detected an alert is stored.

In the access-source identification information 503, the same identification information as the access-source identification information 401 of the metric data described in the metric table 400 used for detecting the alert and the transfer-source identification information 303 of the packet data described in the time-series data table 300 is stored. By the access-source identification information 503, the alert is associated with metric data 403 specified by the access-source identification information 401 of the metric table 400 and the packet data specified by transfer-source identification information 303 of the time-series data table 300.

In the access-destination identification information 504, the same identification information as the access-destination identification information 402 of the metric data described in the metric table 400 used for detecting the alert and the transfer-destination identification information 304 of the packet data described in the time-series data table 300 is stored. By the access-destination identification information 504, the alert is associated with metric data 403 specified by the access-destination identification information 402 of the metric table 400 and the packet data specified by transfer-destination identification information 304 of the time-series data table 300.

The alert content 505 indicates a content of an alert. In the present example, the metric 403, which is to be monitored, is a response time, and thus, a delay, a no-response, etc., are mainly recorded as the alert content 505.

At each base 10, the alert transfer part 101 of the real-time processing server 100 detects an alert, and stores each item of information on the alert in the alert table 500.

FIG. 6 is a diagram showing one example of an index specifying table generated at the base.

The index specifying table 600 records the alert ID 601, a search ID 602, the index list 603 for each unit in which the collection target packet data is collected.

The alert ID 601 is an ID for uniquely specifying an alert sensed at each base 10. With the alert ID 601, the packet data of a unit to be collected, is associated with the alert information indicated by the alert ID 501 in the alert table 500 within the same base 10.

The search ID 602 is identification information for uniquely specifying a unit in which the packet data on the alert ID 601 is collected when the network monitoring center 20 requests the base 10 to acquire packet data by using the alert ID 601 as a key, or when the packet data is transmitted from the base 10 to the network monitoring center 20. With respect to an absolute value of the search ID, the closer to the alert occurrence date and time point 502, the smaller, and the farther from the alert occurrence date and time point 502, the larger.

The index list 603 is list information on indexes imparted to each packet data. With the index, it is possible to uniquely specify a place, in the data store 130, to store the packet data in which the alert of the alert ID 601 has occurred and which is described in the time-series data table 300. By the index described in the index list 603, the packet data of a unit to be collected, is associated with the packet data indicated by the index 306 of the time-series data table 300.

The information in the index specifying table 600 at each base 10 is stored when the index calculation part 112 of the index calculation server 110 of the base 10 executes a process in FIG. 9.

FIG. 7 is a diagram showing one example of a base-apparatus table held in a network monitoring center.

In the base-apparatus table 700, base identification information 701 and apparatus identification information 702 for each base are recorded.

The base identification information 701 is identification information for uniquely specifying each base 10, such as a base name, a name of places, and a branch number.

The apparatus identification information 702 is identification information for uniquely specifying an apparatus by which the packet data is exchanged at each base 10, and includes an IP address and a host name, for example. With the apparatus identification information 702, the apparatus at the base is associated with the alert specified by the access-source identification information 503 or the access-destination identification information 504 in the alert table 500 within the same base.

The information described in the base-apparatus table 700 is input by a user, configuration management software, or an asset management tool, for example.

Figure 8:
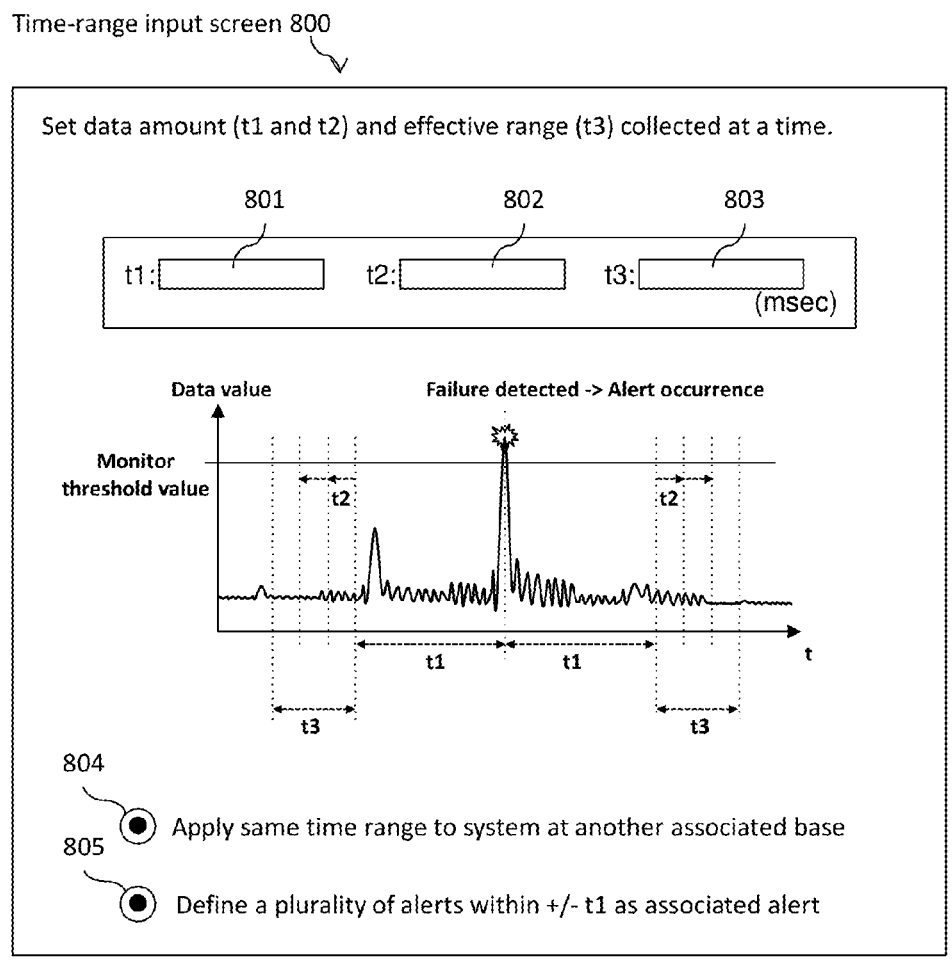
FIG. 8 is a diagram showing one example of a time-range input screen 800 provided by a time-range input part 208 of a data collection server 200

FIG. 8 is a diagram showing one example of a time-range input screen 800 provided by the time-range input part 208 of the data collection server 200.

The time-range input screen 800 has a t1 input field 801, a t2 input field 802, a t3 input field 803, a time-range applied base range designation field 804, and an alert association designation field 805.

The t1 input field 801 is an interface for inputting a time t1 at which the packet data that is stored in the time-series data table 300, with the alert ID 501 as a key, is collected at a time from the network monitoring center 20. A user or an application is capable of collecting, at a time, the packet data in times t1 before and after the alert occurrence date and time point 502 with the alert occurrence date and time point 502 as a starting-point.

The t2 input field 802 is an interface for inputting a time unit during which data is collected in a single operation, when the packet data (data to be selectively collected) before and/or after the data to be obligatorily collected is additionally collected after the packet data (data to be obligatorily collected) in a range designated mainly by the time t1 is collected. As a result of only the packet data that matches a display time width of the monitor screen being collected or only a small amount of packet data being collected on demand, a user or an application is capable of avoiding an unnecessary data transfer.

The t3 input field 803 is an interface for setting a time of the data to be selectively collected.

The time-range applied base range designation field 804 is an interface for designating the base 10 to which the input times t1 to t3 are applied. Specifically, the time-range applied base range designation field 804 is an interface for selecting whether the input times t1 to t3 are applied only to the base 10 at which an alert has occurred or whether the input times t1 to t3 are applied not only to the base 10 at which the alert has occurred but also to a plurality of bases 10 associated with the alert.

The alert association designation field 805 is an interface for designating another alert which occurs within the times t1 before and after the occurrence date and time point 502 of the sensed alert of an alarm, as an associated alert. Specifically, whether or not these alerts are associated to each other is selected.

FIG. 9 is a flowchart showing one example of an index calculation process.

Upon receipt of an alert A0 described in the alert table 500 (s101), the alert information acquisition part 111 of the index server 110 sets the time t0 to the alert occurrence date and time point 502 and instructs the index calculation part 112 to execute a process described below.

The index calculation part 112 determines whether or not there are a plurality of bases 10 which are to be monitored (s102). Specifically, time-range applied base range designation information input via the time-range input part 208 of the network monitoring center 20 and a time-range applied base range designation field 804 of the time-range input screen 800 is transmitted via the communication I/F 204 to the index calculation server 110 of the base 10. The index calculation part 102 determines whether or not there are a plurality of bases 10 which are to be monitored, on the basis of whether or not the time-range applied base range designation information is validated.

When the time-range applied base range designation information is validated (that is, when not only the base 10 from which the alert occurs but also a plurality of bases associated with the base 10 are included, s102: Y), the index calculation part 112 proceeds to s103a, and when the time-range applied base range designation information is invalidated (that is, when only the base 10 from which the alert occurs is included, s102: N), the index calculation part 112 proceeds to s130b.

When the time-range applied base range designation information is validated (s102: Y), the index calculation part 112 determines, with respect to the alert described in the alert table 500 of the base 10 and the alert described in the alert table 500 at another base associated with the base 10, whether or not another alert A1 which occurs within the times t1 before and after the alert occurrence date and time point 502 for the alert A0 is defined to be associated with the alert A0 (s103a). Specifically, alert association information input via the time-range input part 208 of the network monitoring center 20 and an alert association designation field 805 of the time-range input screen 800 is transmitted via the communication I/F 204 to the index calculation server 110 of the base 10. The index calculation part 102 makes a determination on the basis of whether or not the alert association information is validated.

When the alert association information is validated (that is, when another alert A1 which occurs within the times t1 before and after the occurrence date and time point 502 of the alert A0 are defined as an alert being associated with A0, s103a: Y), the index calculation part 112 proceeds to s104a, and when the alert association information is invalidated (that is, when another alert A1 which occurs within the times t1 before and after the occurrence date and time point 502 of the alert A0 is defined as a respectively independent and different alert, s103a: N), the index calculation part 112 proceeds to s104b.

When the alert association information is validated (s103a: Y), the index calculation part 112 instructs the time-range change part 113 to execute processes from s1501 to s1505 described in FIG. 15 described later (s104a).

Further, when the alert association information is invalidated (s103a: N), the index calculation part 112 instructs the time-range change part 113 to execute processes from s1401 to s1404 in FIG. 14 described later (s104b).

When the time-range applied base range designation information is invalidated (s102: N), the index calculation part 112 executes the same process as that in s103a on an alert described in the alert table 500 at the base 10 only (s103b). However, when the alert association information is validated (s103: Y), the process proceeds to s104c, and when the alert association information is invalidated (s103b: N), the process proceeds to s105.

When the alert association information is validated (s103b: Y), the index calculation part 112 instructs the time-range change part 113 to execute processes from s1301 to s1305 described later (s104c).

When the alert association information is invalidated (s103b: N), the index calculation part 112 determines whether or not a storage category of the data store 130 in which the time-series data table 500 is stored is a file access storage or a block access storage (s105).

When the storage category of the data store 130 is the file access storage (s105: Y), the index calculation part 112 proceeds to s106a, and when the storage category of the data store 130 is the block access storage (s105: N), the index calculation part 112 proceeds to s106b.

When the storage category of the data store 130 is the file access storage (s105: Y), the index calculation part 112 executes processes from s1201 to s1208 described in FIG. 12 described later (s106a).

On the other hand, when the storage category of the data store 130 is the block access storage (s105: N), the index calculation part 112 executes processes from s1101 to s1105 described in FIG. 10 (s106b).

Figure 10:
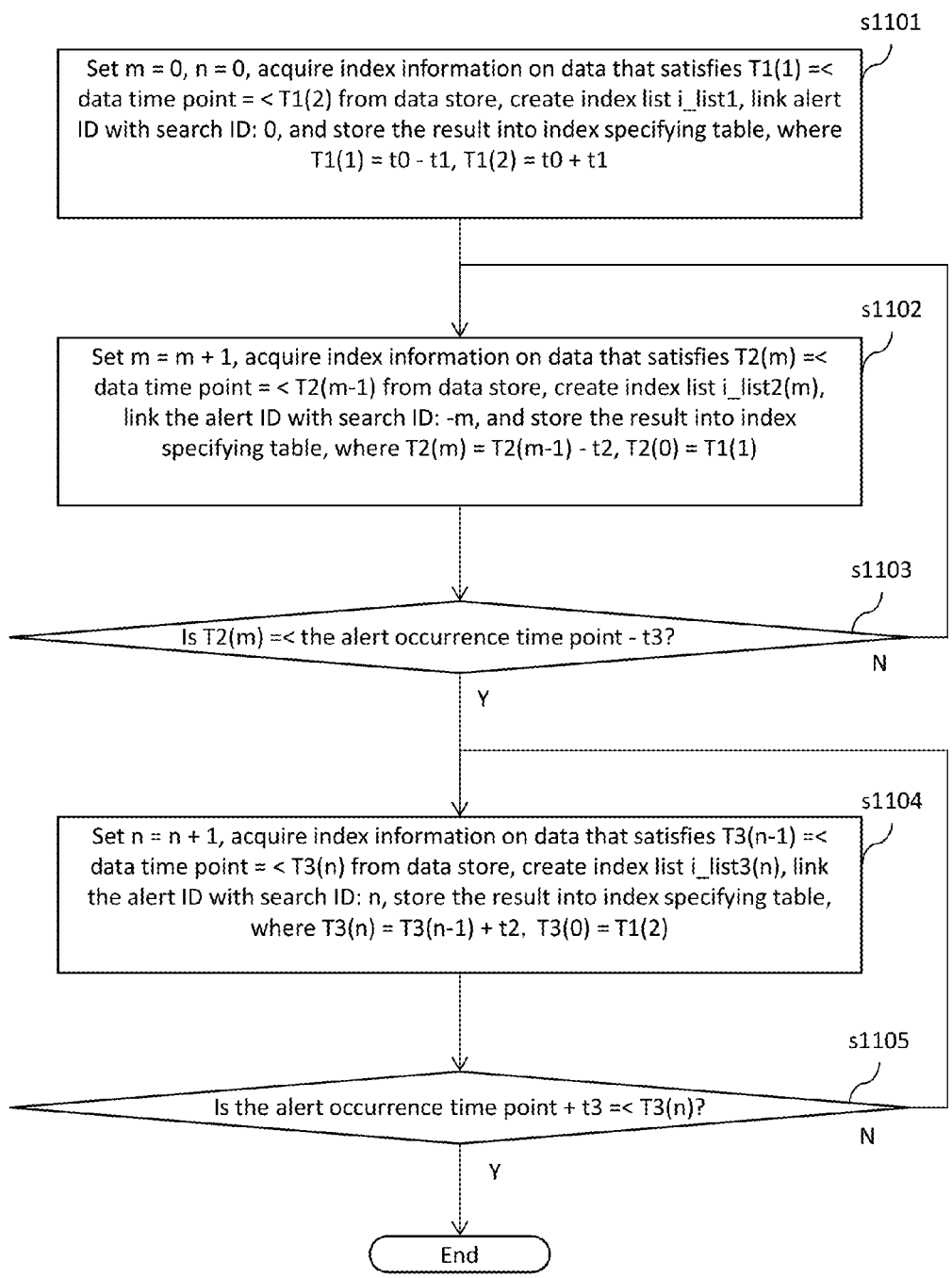
FIG. 10 is a flowchart of an index calculation process in which block access data is to be processed

FIG. 10 is a flowchart of an index calculation process in which the block access data is to be processed.

The index calculation server 110 is notified of the alert information including the alert ID, from the real-time processing server 100. The index calculation part 112 of the index calculation server 110 sets variables m and n used as the search ID 602 to m=0 and n=0, acquires the index 306 of the packet data that satisfies T1(1)≤time point 301≤T1(2) from the time-series data table 300 of the data store 130, creates an index list i_list1 by putting all the acquired indexes 306 altogether, links the alert ID 501 of the notified alert with a search ID:0 in the index list i_list1, and stores the result into the index specifying table 600 (s1101).

T1(1) and T1(2) are time points representing a lower limit and an upper limit of a range over which the packet data described in the time-series data table 300 is acquired, and in this case, T1(1)=t0−t1, T1(2)=t0+t1.

Next, the index calculation part 112 sets m=m+1, acquires the index 306 of the packet data that satisfies T2($m$)≤time point 301<T2($m$−1) from the time-series data table 300 of the data store 130, creates an index list i_list2($m$) by putting all the acquired indexes 306 altogether, links the alert ID 501 of the notified alert with a search ID:−m in the index list i_list2($m$), and stores the result into the index specifying table 600 (s1102).

T2($m$) and T2($m$−1) are time points representing a lower limit and an upper limit of a range over which the packet data described in the time-series data table 300 is acquired, and in this case, T2($m$)=T2($m$−1)−t2 and T2(0)=T1(1).

The index calculation part 112 determines whether or not T2($m$) is equal to or less than a value obtained by subtracting the time t3 from the occurrence date and time point 502 of the notified alert (s1103). When T2($m$) is larger than the value obtained by subtracting the time t3 from the alert occurrence date and time point 502 (s1103: N), the index calculation part 112 returns to s1102, and when T2($m$) is equal to or less than the value obtained by subtracting the time t3 from the alert occurrence date and time point 502 (s1103: Y), the index calculation part 112 proceeds to s1104.

When the value of T2($m$) is equal to or less than the value obtained by subtracting the time t3 from the alert occurrence date and time point 502 (s1207: Y), the index calculation part 112 sets n=n+1, acquires the index 306 of the packet data that satisfies T3($n$−1)<time point 301≤T3($n$) from the time-series data table 300 of the data store 130, creates an index list i_list3($n$) by putting all the acquired indexes 306 altogether, links the alert ID 501 of the alert with a search ID: n in the index list i_list3($n$), and stores the result into the index specifying table 600 (s1104).

T3($n$) and T3($n$−1) represent an upper limit and a lower limit of a range over which the packet data described in the time-series data table 300 is acquired, and in this case, T3($n$)=T3($n$−1)+t2, and T3(0)=T1(2).

Subsequently, the index calculation part 112 determines whether or not T3($n$) is equal to or more than a value obtained by adding the time t3 to the alert occurrence date and time point 502 (s1105). When T3($n$) is smaller than the value obtained by adding the time t3 to the alert occurrence date and time point 502 (s1105: N), the index calculation part 112 returns to s1104, and when T3($n$) is equal to or more than the value obtained by adding the time t3 to the alert occurrence date and time point 502 (s1105: Y), the index calculation part 112 ends the process.

Figure 11:
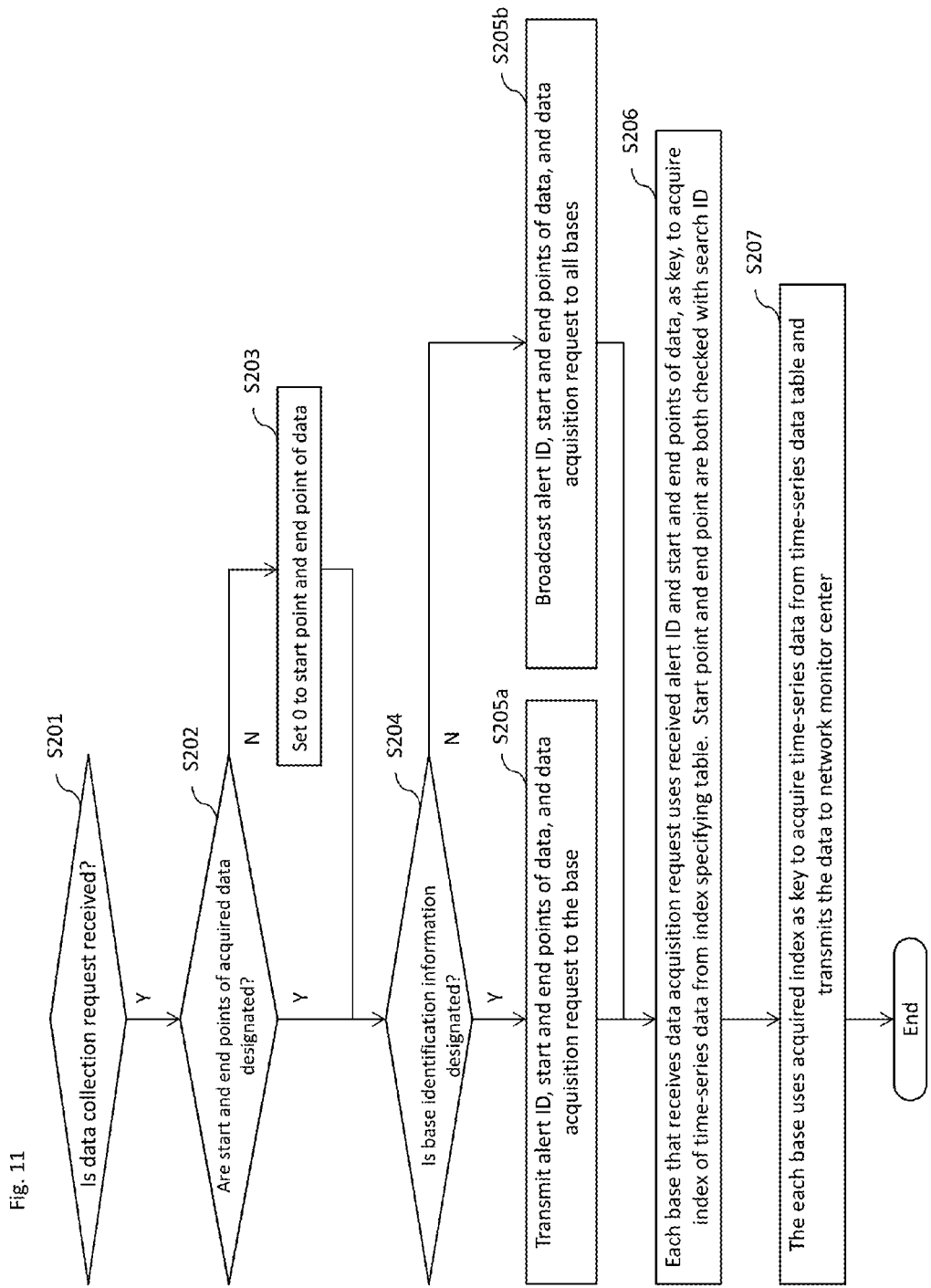
FIG. 11 is a flowchart showing a file collection process by a data collection server 200 in a network monitoring center 20 and a data transfer server 120 in each base 10

FIG. 11 is a flowchart showing a file collection process by the data collection server 200 in the network monitoring center 20 and the data transfer server 120 in each base 10.

Upon receipt of the data collection request including the designated alert ID 501 from a user or an application, the data-request transfer part 207 of the data collection server 200 of the network monitoring center 20 (s201) executes the following process. In the data transfer request, a start point and an end point of acquiring packet data that is to be acquired may be designated, and these points may not be designated.

The data-request transfer part 207 determines whether or not the start point and the end point of acquiring the packet data that is to be acquired are designated in the received data transfer request (s202). When the start point and the end point are not designated (s202: N), the data-request transfer part 207 proceeds to s203 and when the start point and the end point are designated (s202: Y), the data-request transfer part 207 proceeds to s204. The start point and the end point are data similar to the identification information described in the search ID 602 of the index specifying table 600. The start point and the end point are a part of a data acquisition request applied to the data collection server 200 of the network monitoring center 20 from a user or an application.

When the start point and the end point are not described (s202: N), the data-request transfer part 207 sets both of the start point and the end point of acquiring the packet data to 0 (zero) (s203). This means to request acquisition of data to be obligatorily acquired. As a result, the data collection server 200 of the network monitoring center 20 is capable of collecting the packet data described in the time-series data table 300 at the base 10, within the times t1 before and after the alert occurrence date and time point 502.

When the start point and the end point are described (s202: Y) or after the process in s203 is ended, the data-request transfer part 207 determines whether or not the base identification information 701 of the base 10 at which the packet data is to be collected is designated in the data transfer request (s204). When the base identification information 701 of the base 10 is designated (s204: Y), the data-request transfer part 207 proceeds to s205$a$, and when the base identification information 701 of the base 10 is not designated (s204: N), the data-request transfer part 207 proceeds to s205$b$.

When the base identification information 701 of the base 10 at which the packet data is to be collected is designated (s204: Y), the data-request transfer part 207 transmits the data acquisition request including the alert ID 501, and the start point (that is, the search ID 602) and the end point (that is, the search ID 602) of acquiring the packet data, to the data-request reception part 121 of the data transfer server 120 at the base 10 designated by the base identification information 701 (s205$a$). In this case, TCP/IP is used as a communication protocol, for example.

When the base identification information 701 of the base 10 at which the packet data is to be collected is not designated (s204: N), the data-request transfer part 207 transmits by broadcast the data acquisition request including the alert ID 501, and the start point and the end point of acquiring the packet data, to the data-request reception part 121 of the data transfer server 120 at all the bases 10 (s205$b$). In this case, UDP is used as a communication protocol, for example.

The data-request reception part 121 of the data transfer server 120 at each base 10 that receives the data acquisition request gives, as a key, the received alert ID 501, the start point, and the end point, to the data collection part 122 within the base 10 of the data-request reception part 121 to request to search the index specifying table 600. The data collection part 122 that is requested to search the index specifying table 600 uses the given alert ID 501, start point, and end point as a key to search the index specifying table 600, and acquires the index list 603 of the packet data that is to be collected (s206). At this time, the received alert ID 501 is checked with the alert ID 601 of the index specifying table 600, and the start point and the end point are both checked with the search ID 602.

The data collection part 122 uses each index within the index list 603 acquired in the process in s206 as a key to search the time-series data table 300, and acquires the packet data. Then, the data collection part 122 instructs the data transfer part 123 to transmit the acquired packet data to the network monitoring center 20. The instructed data transfer part 123 transmits the acquired packet data to the data collection server 200 of the network monitoring center 20 (s207) and ends the process.

As a result of the above processes, the data collection server 200 of the network monitoring center 20 is capable of efficiently collecting, at a time, only the time series packet data within a range desired by a user or an application. Further, when the packet data is collected, the data transfer server 120 at the base 10 is capable of shortening a time required for collecting the data because it is not needed to refer to the content of the packet data.

Figure 12:
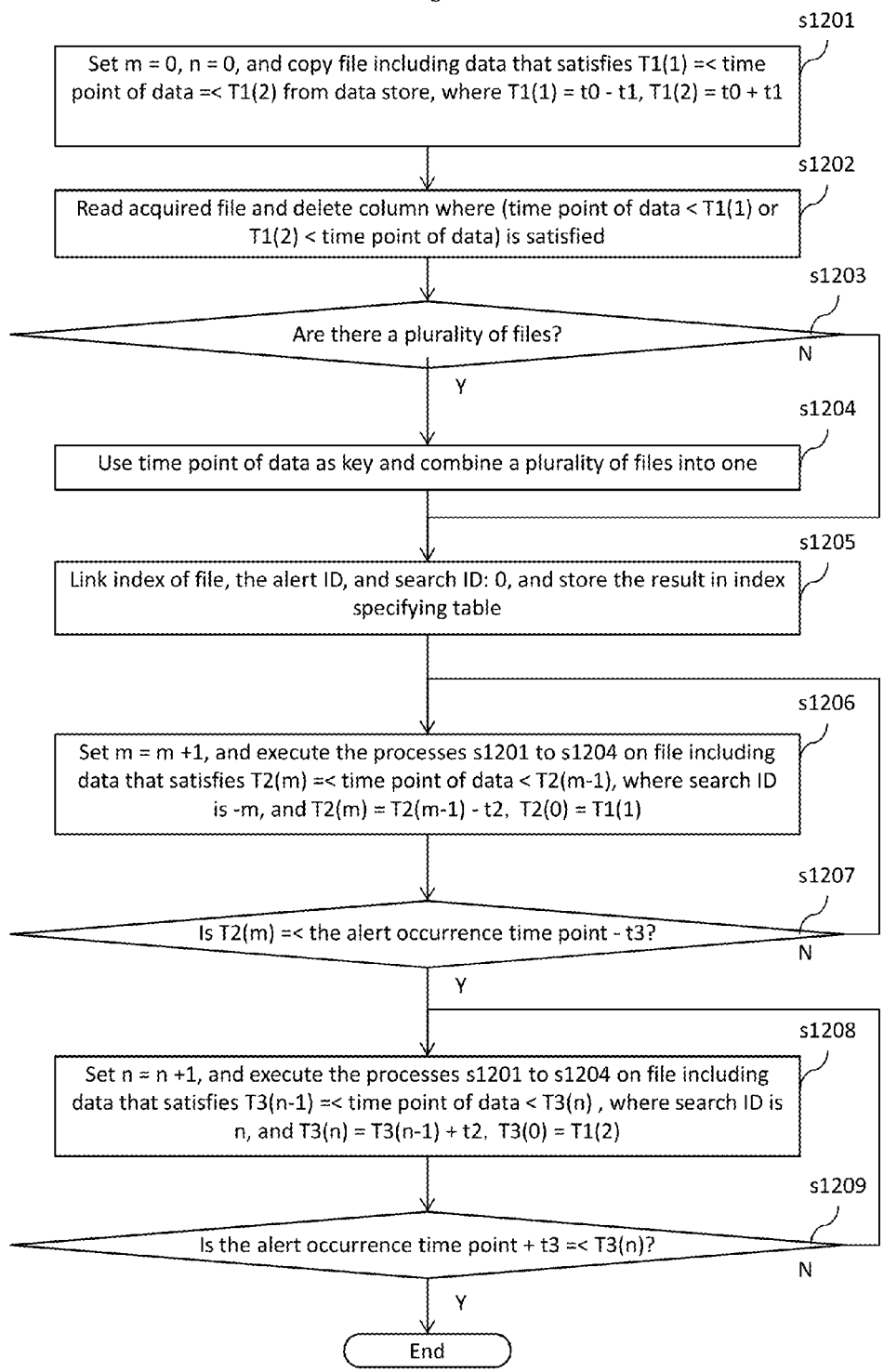
FIG. 12 is a flowchart of an index calculation process in which file access data is to be processed. A case is assumed where a file access storage is used for a base 10.

FIG. 12 is a flowchart of an index calculation process in which file access data is to be processed. A case is assumed where a file access storage is used for a base 10.

When the file access is concerned, the index calculation part 112 of the index server 110 at each base 10 executes processes of s1201 to s1209 shown in FIG. 12 instead of the processes of s1101 to s1105 shown in FIG. 10.

The index calculation part 112 sets variables m and n used as the search ID 602 to m=0, n=0, and copies one or a plurality of files including packet data that satisfies T1(1) ≤time point 301≤T1(2) from the time-series data table 300 of the data store 130 (s1201). T1(1) and T1(2) represent a lower limit and an upper limit of a range over which the packet data is acquired from the time-series data table 300, and in this case, T1(1)=t0−t1, T1(2)=t0+t1.

Next, the index calculation part 112 reads each of the copied files, and if there is a file including a column in which the packet data that satisfies (time point 301<T1(1)) or (T1(2)<time point 301) is described, then the index calculation part 112 deletes the column from the file (s1202).

Subsequently, the index calculation part 112 determines whether or not there are a plurality of copied files (s1203), and when there are the plurality of files (s1203: Y), the index calculation part 112 proceeds to s1204, and when there is one file (s1203: N), the index calculation part 112 skips s1204 and proceeds to s1205.

In s1204, when there are a plurality of copied files (s1203: Y), the index calculation part 112 reads each file and combines the data in the files, sorts out the packet data in the files, by using the time point 301 as a key, in ascending order, and outputs the resultant one file (s1204).

In s1205, the index calculation part 112 links the index of the packet data of the file with the index list 603, the alert ID of the sensed alert with 601, and the search ID:0 with the search ID 602 respectively, and stores the result into the index specifying table 600 (s1205).

Next, the index calculation part 112 sets m=m+1, and executes processes from the above-described s1201 to s1204, on one or a plurality of files including the packet data that satisfies T2(m)≤time point 301<T2(m−1) and that is described in the time-series data table 300 (s1206), where the search ID 602 is −m, and T2(m)=T2(m−1)−t2, T2(0)=T1(1).

The index calculation part 112 determines whether or not the value of T2(m) is equal to or less than the value obtained by subtracting the time t3 from the occurrence date and time point of the sensed alert 502 (s1207), when the value of T2(m) is larger than the value obtained by subtracting the time t3 from the alert occurrence date and time point 502 (s1207: N), the index calculation part 112 returns to s1206, and when the value of T2(m) is equal to or less than the value obtained by subtracting the time t3 from the alert occurrence date and time point 502 (s1207: Y), the index calculation part 112 proceeds to s1208.

In s1208, when the value of T2(m) is equal to or less than a value obtained by subtracting the time t3 from the alert occurrence date and time point 502 (s1207: Y), the index calculation part 112 sets n=n+1, and executes processes from s1201 to s1204 on one or a plurality of files including the packet data that satisfies T3(n−1)<time point 301≤T3(n) and that is described in the time-series data table 300 (s1208), where the search ID 602 is n, and T3(n)=T3(n−1)+t2, T3(0)=T1(2).

Subsequently, the index calculation part 112 determines whether or not the value of T3(n) is equal to or more than a value obtained by adding the time t3 to the alert occurrence date and time point 502 (s1209), and when the value of T3(n) is smaller than the value obtained by adding the time t3 to the alert occurrence date and time point 502 (s1209: N), the index calculation part 112 returns to s1208, and when the value of T3(n) is equal to or more than the value obtained by adding the time t3 to the alert occurrence date and time point 502 (s1209: Y), the index calculation part 112 ends the process.

As a result of the above-described processes, even when the storage of the file access is to be processed, if only the time-series data within an acquisition target range is output, as a file for each acquisition unit, at the base 10, and the index is imparted to the data in the file, then it is possible to efficiently collect, by a request from the network monitoring center 20, only the time-series data within a range desired by a user or an application, and during the collection of the time-series data, the data transfer server 120 does not need to refer to the content of the data, and thus, it is possible to shorten a time required for collecting the data.

It is noted that when there occurs another alert within the times t1 before and after the occurrence date and time point 502 of a certain alert, it may be possible to process each alert independently; however, in the present example, a plurality of alerts are associated and the packet data possibly associated with these alerts are collected at a time, and therefore, the time point t0 and the time t1 are designed to be changeable. This point will be described below.

Figure 13:
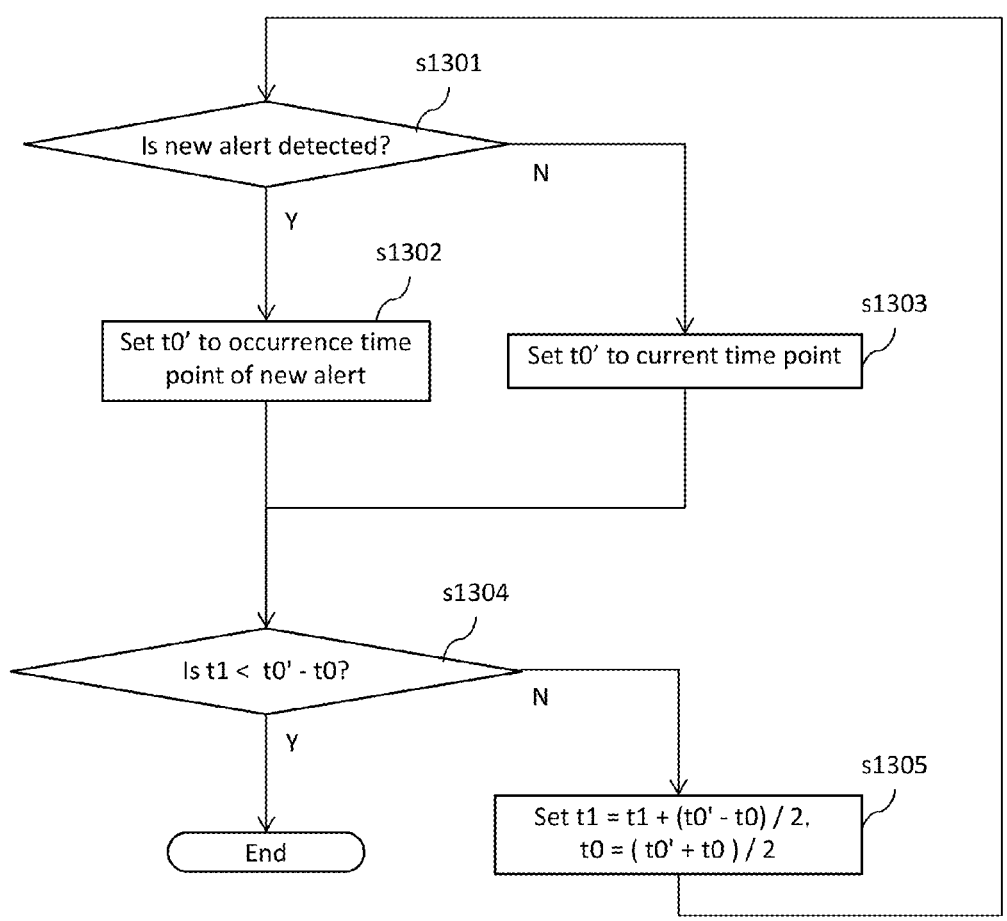
FIG. 13 is a flowchart showing one example of a time-range change process by an index calculation server 110 at each base 10

FIG. 13 is a flowchart showing one example of a time-range change process by the index calculation server 110 at each base 10.

The time-range change part 113 of the index server 110 at each base 10 determines whether or not another alert is newly detected (s1301), and when a new alert is detected (s1301: Y), the time-range change part 113 proceeds to s1302, and when a new alert is not detected (s1301: N), the time-range change part 113 proceeds to s1303.

In s1302, when a new alert is detected, the time-range change part 113 stores a time point at which the detected new alert occurs, in a variable t0' where a time point at which the detected new alert occurs is stored (s1302).

In s1303, when a new alert is not detected, the time-range change part 113 stores a current time point, in a variable t0' where a time point at which the detected new alert occurs is stored (s1303).

Subsequently, the time-range change part 113 subtracts the time point t0 from the variable t0' set in s1302 or s1303 and determines whether or not the value obtained by the subtraction is larger than the time t1 (s1304), and when the value obtained by the subtraction is larger than the time t1 (s1304: Y), the time-range change part 113 ends the process, and when the value obtained by the subtraction is equal to or less than the time t1 (s1304: N), the time-range change part 113 proceeds to s1305.

The time-range change part 113 sets a center time point between the time point t0 and the above-described time point t0' at which the new alert occurs, to the alert occurrence date and time point 502, and further, adds a difference between the time point t0 and the center time point, to the time t1, and sets the resultant time to a new t1. Specifically, the time-range change part 113 stores (t0'+t0)/2 in t0, adds (t0'−t0)/2 to t1, and returns to the process in s1301 (s1305).

As shown in FIG. 9, after the process (process in s104b in FIG. 9) in FIG. 13, the index calculation process (process in s106b in FIG. 9) shown in FIG. 10 or the index calculation process (process in s106a in FIG. 9) shown in FIG. 12 is executed.

The process in FIG. 13 enables respective association of a plurality of alerts which occur in a close time point and collective collection of the time-series packet data associated with the cause of these alerts, facilitates alert analysis, and shortening of a time for collecting the data.

Figure 14:
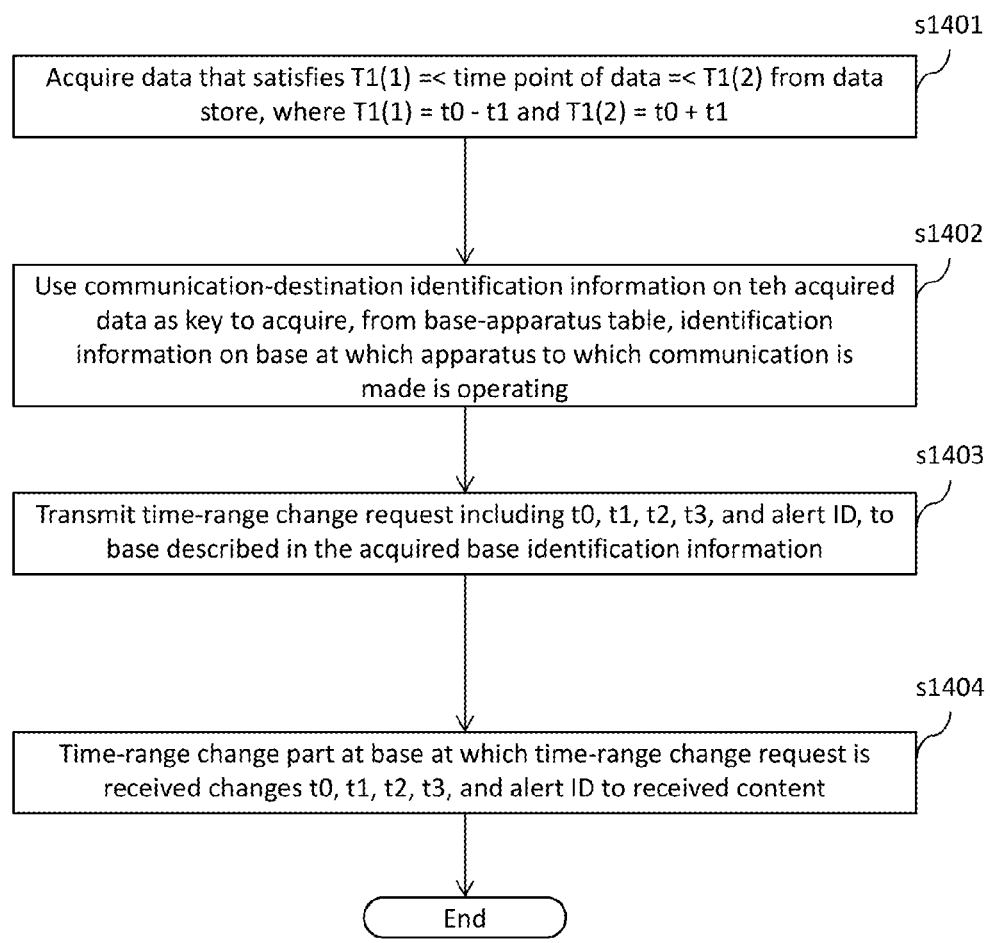
FIG. 14 is a flowchart showing a process in which packet data can be acquired in the same time range as at a base 10 different from a base 10 at which an alarm is sensed

FIG. 14 is a flowchart showing a process in which the packet data can be acquired in the same time range even at a base 10 different from a base 10 at which the alarm is sensed.

In the present example, when each base 1 senses an alert, the base 10 may store the packet data in a time range of the base 10, into the time-series data table 300, and upon receipt of the data collection request from the network monitoring center 20, the base 10 may transmit the packet data stored in the time-series data table 300, to the network monitoring center 20. However, in this case, at the base 10, when the alert is sensed, the associated base 10 is notified of a time range in which the packet data is acquired, and also at the notified base 10, the packet data is acquired in the notified time range.

The time-range notification part 114 at the base 10 that has sensed the alert searches the time-series data table 300 to acquire the packet data that satisfies T1(1)≤time point 301≤T1(2), where T1(1)=t0−t1, T1(2)=t0+t1 (s1401).

Subsequently, the time-range notification part 114 uses the communication-destination identification information 304 of the acquired packet data as a key, and acquires the base identification information 701 of each base 10 where the same identification information as the communication-destination identification information 304 of the acquired packet is stored in the apparatus identification information 702 of the base-apparatus table 700 (s1402).

Further, the time-range notification part 114 transmits, to the time-range change part 113 of the index calculation server 110 at each base 10 described in the acquired base identification information 701, a time-range change request including the time point t0, the times t1, t2, t3, and the alert ID 501 of the sensed alarm which are set to the apparatuses itself (s1403).

The time-range change part 113 of the index server 110 at the base 10 that receives the time-range change request changes the time point t0, the times t1, t2, t3, and the alert ID 501 of the apparatuses itself to the received time point t0, times t1, t2, t3, and the alarm ID (s1404), and ends the process.

As shown in FIG. 9, after the process (process in s104c in FIG. 9) in FIG. 14, the index calculation process (process in s106b in FIG. 9) shown in FIG. 10 or the index calculation process (process in s106a in FIG. 9) shown in FIG. 12 is executed.

Such a process in FIG. 14 enables collection, in the same time range, of the packet data stored in another base 10 that is associated with the alert sensed at any base 10 or is possibly influenced by the alert, and improves usability of cause analysis of an alert.

Figure 15:
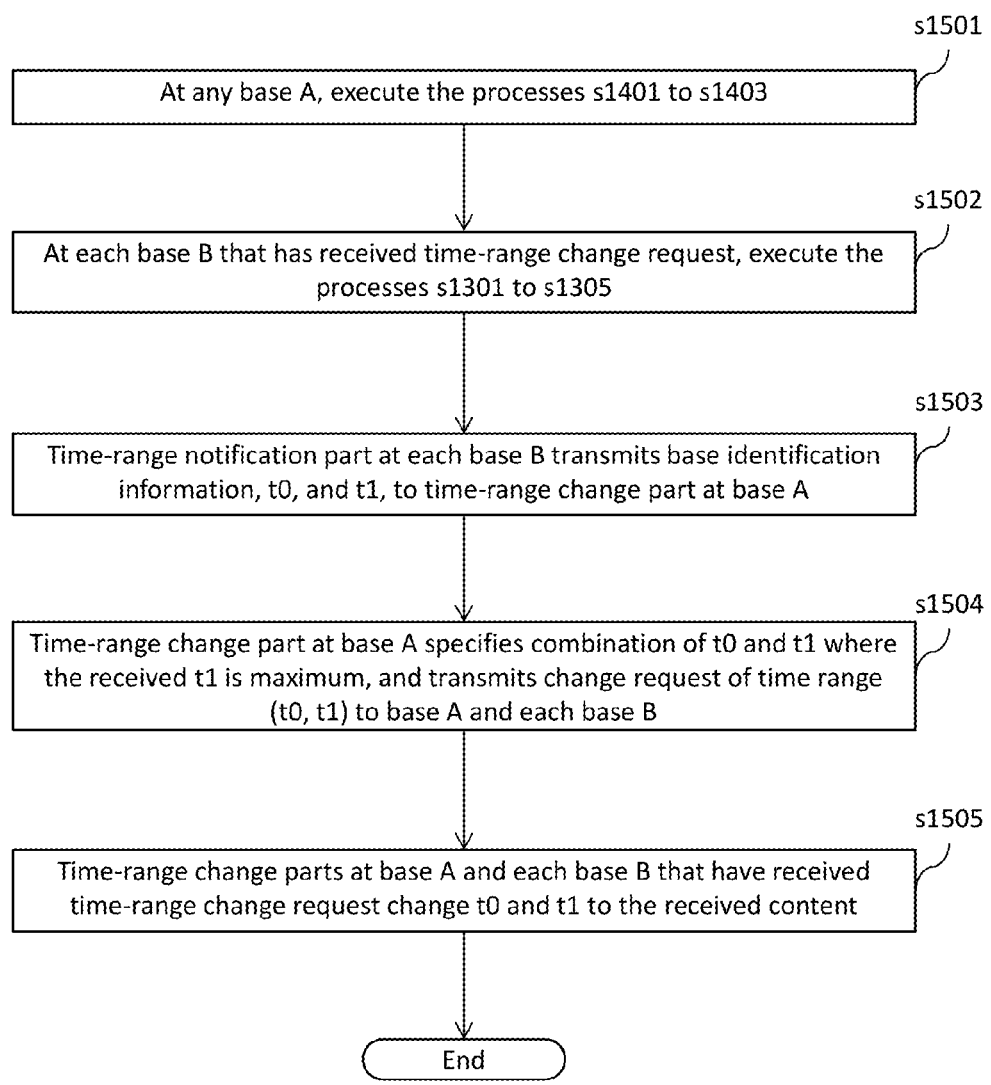
FIG. 15 is a flowchart showing a process in which packet data can be acquired by matching a time range at a plurality of bases 10 at which an alert is sensed

FIG. 15 is a flowchart showing a process in which the packet data can be acquired by matching time ranges at a plurality of bases 10 at which an alert is sensed.

In the process in FIG. 14, the time point t0 and the time t1 at another base 10 associated with the alert sensed by a certain base 10 are forcibly updated, and thus, even when an alert is sensed also at the other bases 10, the alerts is defined as respectively independent alerts. On the other hand, in the process in FIG. 13, a plurality of alerts sensed at a close time point at one base 10 are associated, and the packet data in a range enabling analysis of the alerts is acquired.

On the other hand, in the process in FIG. 15, the alert sensed at a certain base 10 and the alert sensed at another base 10 at a close time point are associated, and the data in a range enabling the analysis of the alerts is to be collected by a plurality of the bases 10.

With reference to FIG. 15, at a certain base 10_A at which the alarm has been sensed, processes similar to the processes from s1401 to s1403 shown in FIG. 14 are executed (s1501). At each base 10_B that receives the time-range change request transmitted by the processes at the base 10_A, processes similar to the processes from s1301 to s1305 shown in FIG. 13 are executed (s1502).

Thereafter, the time-range notification part 114 of the index calculation server 110 at each base 10_B transmits, to the time-range change part 113 of the index calculation server 110 at the base 10_A, the base identification information 701 of the base 10_B, and the time point t0 and the time t1 used at the base 10_B (s1503).

The time-range change part 113 of the index calculation server 110 at the base 10_A specifies a combination of a time point t0 and the time t1 at which a time t1 received from each base 10_B shows a maximum value, and transmits the time-range change request including the specified time point t0 and the time t1, to each base 10_B (s1504).

At each base 10_B that has received the time-range change request and the base 10_A, the time-range change part 113 of the index calculation server 110 changes the setting of the time point t0 and the time t1 in the base 10, to the time point t0 and the time t1 received together with the time-range change request (s1505), and ends the process.

The process in FIG. 15 enables respective association of a plurality of alerts which occur at a plurality of associated bases 10 within the times t1 or less before and after the occurrence date and time point of the alert which has occurred first, and collecting of the packet data used for analyzing the cause of the plurality of alerts at a time.

As shown in FIG. 9, after the process (process in s104a in FIG. 9) in FIG. 15, the index calculation process (process in s106b in FIG. 9) shown in FIG. 10 or the index calculation process (process in s106a in FIG. 9) shown in FIG. 12 is executed.

Thus, the embodiments and the examples of the present invention are described; however, these are merely illustrative for a purpose of description of the present invention only, and do not intend to limit the scope of the present invention to these examples only. A person skilled in the art is capable of implementing the present invention in various other modes without departing from the gist of the present invention.

REFERENCE SIGNS LIST

10 . . . base (base system), 100 . . . real-time processing server, 101 . . . alert transfer part, 102 . . . real-time analysis part, 103 . . . data acquisition part, 104 . . . CPU, 105 . . . communication I/F, 106 . . . main storage apparatus, 107 . . . external storage apparatus I/F, 110 . . . index calculation server, 111 . . . alert information acquisition part, 112 . . . index calculation part, 113 . . . time-range change part, 114 . . . time-range notification part, 115 . . . communication I/F, 116 . . . CPU, 117 . . . main storage apparatus, 118 . . . external storage apparatus I/F, 120 . . . data transfer server, 121 . . . data-request reception part, 122 . . . data collection part, 123 . . . data transfer part, 124 . . . CPU, 125 . . . communication I/F, 126 . . . main storage apparatus, 127 . . . external storage apparatus I/F, 130 . . . data store, 140 . . . LAN, 20 . . . network monitoring center (center system), 200 . . . data collection server, 201 . . . alert reception part, 202 . . . data acquisition part, 203 . . . CPU, 204 . . . communication I/F, 205 . . . data display part, 206 . . . main storage apparatus, 207 . . . data-request transfer part, 208 . . . time-range input part, 209 . . . external storage apparatus I/F, 210 . . . data store, 220 . . . LAN, 30 . . . WAN, 300 . . . time-series data table, 301 . . . time point, 302 . . . sequence ID, 303 . . . transfer-source identification information, 304 . . . transfer-destination identification information, 305 . . . next sequence ID, 306 . . . index, 400 . . . metric table, 401 . . . access-source identification information, 402 . . . access-destination identification information, 403 . . . metric data (response time), 500 . . . alert table, 501 . . . alert ID, 502 . . . occurrence date and time point 503 . . . access-source identification information, 504 . . . access-destination identification information, 505 . . . alert content, 600 . . . index specifying table, 601 . . . alert ID, 602 . . . search ID, 603 . . . index list, 700 . . . apparatus table, 701 . . . base identification information, 702 . . . apparatus identification information, 800 . . . time-range input screen, 801 . . . input field, 802 . . . input field, 803 . . . input field, 804 . . . time-range applied base range designation field, 805 . . . designation field

The invention claimed is:

1. A data transfer monitoring system, comprising:
a base system configured to record and exchange data; and
a center system that is coupled via a network to the base system and is configured to monitor the base system, wherein
the base system is configured to sense an alert with real-time analysis for data to be exchanged, to generate an index for specifying collection target data that is data present within a predetermined collection target time including an alert occurrence time point, to record the collection target data in association with the index, into a time-series data table, to store alert identification information in association with the index, into an index specifying table, and to transmit the alert identification information to the center system,
the center system is configured to designate the alert identification information upon receipt of the alert identification information and to transmit a data request for requesting the collection target data, to the base system,
the base system is configured to acquire, upon receipt of the data request, the index associated with the designated alert identification information by searching the index specifying table, to acquire the collection target data specified by the index from the time-series data table, and to transmit the acquired data to the center system,
the center system is configured to record the collection target data upon receipt of the collection target data, and
the base system is configured to generate the index for each of: as the collection target data, data to be obligatorily collected that is data present within an obligatory-collection target time including the alert occurrence time point; and data to be selectively collected that is data present within a selective-collection target time before and/or after the obligatory-collection target time as selective-collection target data, upon receipt of the data request from the center system, the base system is configured to transmit the data to be obligatorily collected to the center system, and upon further receipt of the data request to request the selective-collection target data from the center system, the base system is configured to transmit the selective-collection target data to the center system.

2. The data transfer monitoring system according to claim 1, wherein
the base system includes a user-interface to receive user input of the selective-collection target time.

3. The data transfer monitoring system according to claim 1, wherein
the base system is configured to divide the selective-collection target time into a plurality of collection unit times and to generate an index for each of: unit data to be selectively collected that is data in each collection unit time,
the center system is configured to transmit a data request by which the unit data to be selectively collected is designated, and
the base system is configured to transmit, upon receipt of the data request, the unit data to be selectively collected designated by the data request, to the center system.

4. The data transfer monitoring system according to claim 1, wherein
when uncollection target data is included in a file including the collection target data in the data to be exchanged, the base system is configured to delete the uncollection target data from the file and to generate the index for the resultant file.

5. The data transfer monitoring system according to claim 1, wherein
when the collection target data that should be transmitted at a time are divided into a plurality of files in the data to be exchanged, the base system is configured to combine the plurality of files and generate an index for one resultant file.

6. The data transfer monitoring system according to claim 1, wherein
when another alert is sensed within a collection target time of an alert occurrence time point for the sensed alert, the base system is configured to expand the collection target time on the basis of the alert occurrence time point for the other alert.

7. The data transfer monitoring system according to claim 1, wherein
the base system includes a plurality of base systems,
a first base system is configured to transmit, when an alert is sensed, alert identification information and a collection target time to a second base system, which is another base system, and
the second base system is configured to apply the received alert identification information and collection target time and to update a time-series data table and an index specifying table.

8. The data transfer monitoring system according to claim 1, wherein
the base system includes a plurality of base systems,
a first base system is configured to transmit, when an alert is sensed, alert identification information, an alert occurrence time point, and a collection target time to a second base system, which is another base system, when an alert occurrence time point for an alert sensed by the first base system is within a collection target time for an alert sensed by the second base system, the second base system is configured to expand the collection target time of the second base system on the basis of the alert occurrence time point of the first base system and to transmit the expanded collection target time to the first base system, and the first base system is configured to specify a maximum collection target time of the expanded collection target time received from the second base system and the collection target time of the first base system, to apply the maximum collection target time to the first base system, and to request the second base system to apply the maximum collection target time.

9. The data transfer monitoring system according to claim 1, wherein the base system includes a real-time processing server, an index calculation server, and a data transfer server, the real-time processing server is configured to sense an alert with real-time analysis for the data to be exchanged, the index calculation server is configured to generate an index for specifying the collection target data, the real-time processing server is configured to record the collection target data in association with the index, into a time-series data table, the index calculation server is configured to store alert identification information in association with the index, into an index specifying table, the real-time processing server is configured to transmit the alert identification information to the center system, and the data transfer server is configured to, upon receipt of the data request from the center system, acquire the index associated with the designated alert identification information by searching the index specifying table, to acquire the collection target data specified by the index from the time-series data table, and to transmit the acquired data to the center system.

10. A data transfer monitoring method for monitoring a base system configured to record and exchange data by a center system that is coupled via a network to the base system and configured to monitor the base system, wherein the base system is configured to:
  sense an alert with real-time analysis for data to be exchanged;
  generate an index for specifying collection target data that is data present within a predetermined collection target time including an alert occurrence time point;
  record the collection target data in association with the index, into a time-series data table;
  store alert identification information in association with the index, into an index specifying table; and
  transmit the alert identification information to the center system, the center system is configured to:
  upon receipt of the alert identification information, designate the alert identification information and transmit a data request for requesting the collection target data, to the base system, the base system is configured to:
  upon receipt of the data request,
  acquire an index associated with the designated alert identification information by searching the index specifying table; and
  acquire collection target data specified by the index from the time-series data table, and transmit the acquired data to the center system, the center system is configured to:
  record the collection target data upon receipt of the collection target data, and the base system is configured to:
  generate the index for each of: as the collection target data, data to be obligatorily collected which is the data present within an obligatory-collection target time including the alert occurrence time point; and data to be selectively collected which is the data present within a selective-collection target time before and/or after the obligatory-collection target time, as the selective-collection target data;
  upon receipt of the data request from the center system, the base system is configured to transmit the data to be obligatorily collected to the center system, and
  upon further receipt of the data request to request the selective-collection target data from the center system, the base system is configured to transmit the selective-collection target data to the center system.

11. The data transfer monitoring method according to claim 10, further comprising:

receiving, by a user-interface of the base system, user input of the selective-collection target time.

12. The data transfer monitoring method according to claim 10, wherein the base system is configured to divide the selective-collection target time into a plurality of collection unit times and to generate an index for each of: unit data to be selectively collected that is data in each collection unit time, the center system is configured to transmit a data request by which the unit data to be selectively collected is designated, and the base system is configured to transmit, upon receipt of the data request, the unit data to be selectively collected designated by the data request, to the center system.

13. A base system in a data transfer monitoring system including a base system configured to record and exchange data and a center system that is coupled via a network to the base system and configured to monitor the base system, comprising:

a real-time processing server;
an index calculation server; and
a data transfer server, wherein the real-time processing server is configured to sense an alert with real-time analysis for data to be exchanged, the index processing server is configured to generate an index for specifying collection target data that is data present within a predetermined collection target time including an alert occurrence time point, the real-time processing server is configured to record the collection target data in association with the index, into a time-series data table, the index calculation server is configured to store alert identification information in association with the index, into an index specifying table, the real-time processing server is configured to transmit the alert identification information to the center system, the data transfer server is configured to, upon receipt of data request by which the alert identification information is designated and which is for requesting collection target data, from the center system, acquire the index associated with the designated alert identification information by searching the index specifying table, and acquire the collection target data specified by the index from the time-series data table, and transmit the acquired data to the center system, and the index processing server is configured to generate the index for each of: as the collection target data, data to be obligatorily collected that is data present within an obligatory-collection target time including the alert occurrence time point; and data to be selectively collected that is data present within a selective-collection target time before and/or after the obligatory-collection target time as selective-collection target data, upon receipt of the data request from the center system, the base system is configured to transmit the data to be obligatorily collected to the center system, and upon further receipt of the data request to request the selective-collection target data from the center system, the base system is configured to transmit the selective-collection target data to the center system.

14. The base system according to claim 13, further comprising:
a user-interface to receive user input of the selective-collection target time.

15. The base system according to claim 13, wherein
the index processing server is configured to divide the selective-collection target time into a plurality of collection unit times and to generate an index for each of: unit data to be selectively collected that is data in each collection unit time, and
the data transfer server is configured to transmit, upon receipt of a data request from the center system designating the unit data to be selectively collected, the unit data to be selectively collected to the center system.

16. The base system according to claim 13, wherein
when uncollection target data is included in a file including the collection target data in the data to be exchanged, the index calculation server is configured to delete the uncollection target data from the file and to generate the index for the resultant file.

17. The base system according to claim 13, wherein
when the collection target data that should be transmitted at a time are divided into a plurality of files in the data to be exchanged, the index calculation server is configured to combine the plurality of files and generate an index for one resultant file.

18. The data transfer monitoring method according to claim 10, wherein
when uncollection target data is included in a file including the collection target data in the data to be exchanged, the base system is configured to delete the uncollection target data from the file and to generate the index for the resultant file.

19. The data transfer monitoring method according to claim 10, wherein
when the collection target data that should be transmitted at a time are divided into a plurality of files in the data to be exchanged, the base system is configured to combine the plurality of files and generate an index for one resultant file.

20. The data transfer monitoring method according to claim 10, wherein
when another alert is sensed within a collection target time of an alert occurrence time point for the sensed alert, the base system is configured to expand the collection target time on the basis of the alert occurrence time point for the other alert.

* * * * *